No. 636,767. Patented Nov. 14, 1899.
J. J. DEAL.
TOY.
(Application filed Apr. 13, 1899.)
(No Model.)
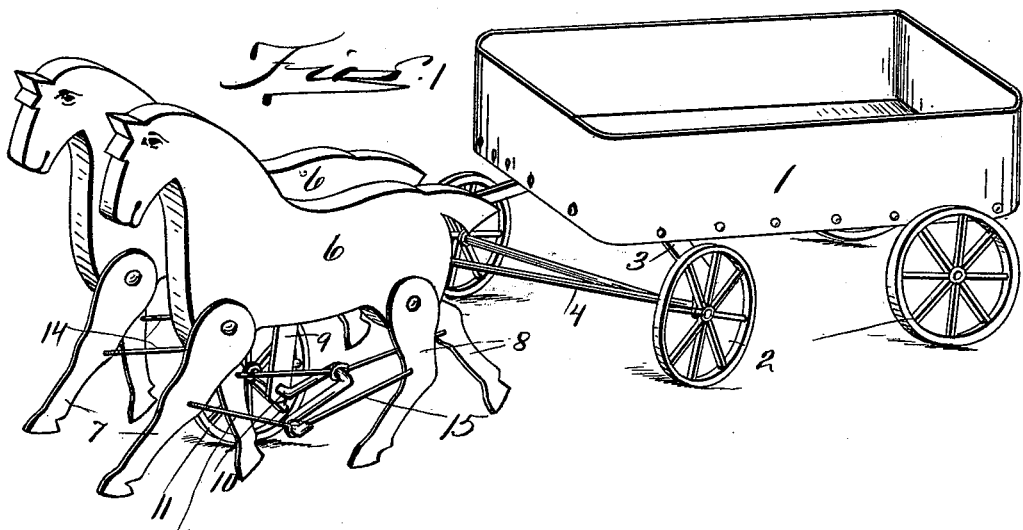
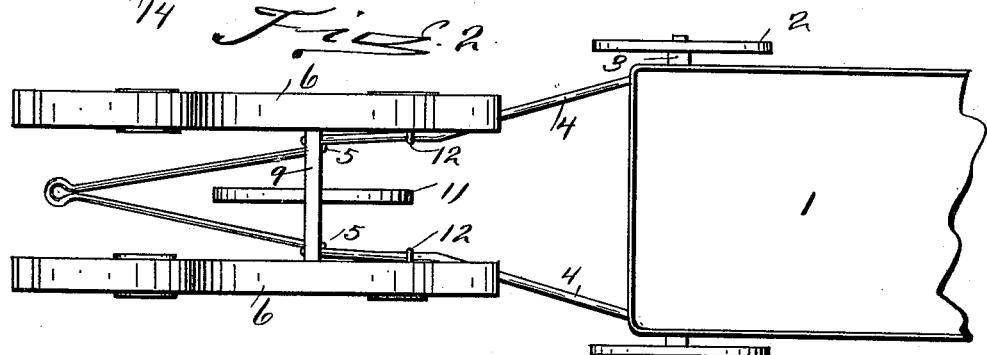
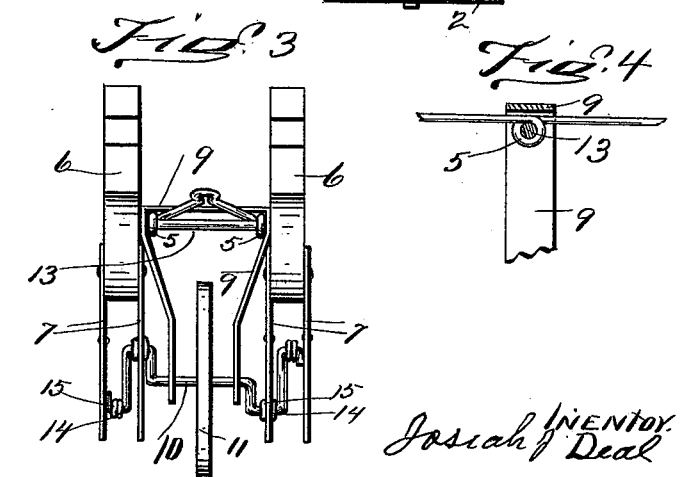
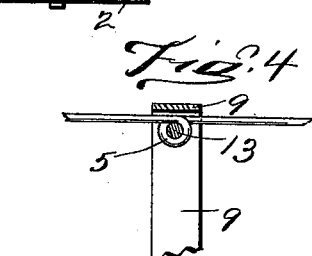

UNITED STATES PATENT OFFICE.

JOSIAH J. DEAL, OF CANTON, OHIO, ASSIGNOR, BY MESNE ASSIGNMENTS, TO THE IDEAL MANUFACTURING CO., OF SAME PLACE.

TOY.

SPECIFICATION forming part of Letters Patent No. 636,767, dated November 14, 1899.

Application filed April 13, 1899. Serial No. 712,836. (No model.)

*To all whom it may concern:*

Be it known that I, JOSIAH J. DEAL, a citizen of the United States, residing at Canton, in the county of Stark and State of Ohio, have invented certain new and useful Improvements in Toys; and I do hereby declare that the following is a full, clear, and exact description of the same, reference being had to the annexed drawings, making a part of this specification, and to the figures of reference marked thereon, in which—

Figure 1 is a perspective view. Fig. 2 is a top view. Fig. 3 is a front end view. Fig. 4 is a view showing a portion of the connecting-brace and illustrating the manner of connecting the tongue.

Similar numerals represent corresponding parts in all the figures of the drawings.

The present invention has relation to toys; and it consists in the different parts and combination of parts hereinafter described, and particularly pointed out in the claim.

In the accompanying drawings, 1 represents the box or body, which is mounted upon suitable axles, and to which axles are connected in the usual manner the wheels 2. To the front or forward axle 3 is connected the tongue 4, which tongue is formed of wire and is extended forward, and between the rear ends of said tongue and the front end thereof are located the loops 5, which loops are for the purpose hereinafter described. The bodies 6 are substantially of the form shown in the drawings, to which bodies are pivotally attached the front legs 7 and the rear legs 8.

For the purpose of holding the bodies 6 in proper relative position the brace 9 is provided, which brace is preferably formed of a single piece of metal and is extended downward below the under portions of the bodies 6, and to which downward-extended portions is journaled the compound crank-shaft 10, said compound crank-shaft being for the purpose hereinafter described. To the compound crank-shaft 10 is securely attached in any convenient and well-known manner the wheel 11, which wheel is located substantially as shown and provides a support for the bodies 6.

For the purpose of assisting in holding the bodies 6 in proper relative position the tongue 4 is formed as shown, its members diverging from the front end thereof to the rear end, and the members of said tongue are connected to the bodies 6 by means of the staples 12 or their equivalents, by which arrangement the bodies are held in a fixed and rigid relative position.

For the purpose of more securely holding the bodies 6 in a fixed relative position the bar 13 is provided, which bar is connected to the brace 9 in any convenient and well-known manner, and said bar 13 passes through the loops 5, formed in the tongue. To the compound crank-shaft 10 are connected the rods or bars 14 and 15, the bars 14 being connected to the front legs 7 and the rods 15 to the rear legs 8, by which arrangement movement is imparted to the legs when rotary motion is imparted to the compound crank-shaft as the toy proper is moved along the floor or ground.

For the purpose of giving life-like movement to the legs the compound crank-shaft is oppositely timed.

Having fully described my invention, what I claim as new, and desire to secure by Letters Patent, is—

The combination of a box or body mounted upon traveling wheels a tongue formed of wire and provided with loops between the ends of said tongue, bodies held in fixed relative position, a brace located between the bodies, a shaft journaled to the brace and provided with a traveling wheel, cranks formed in said shaft, rods journaled to the cranks and connected to the legs pivotally attached to the bodies and a bar connected to the brace and to the tongue, substantially as and for the purpose specified.

In testimony that I claim the above I have hereunto subscribed my name in the presence of two witnesses.

JOSIAH J. DEAL.

Witnesses:
J. A. JEFFERS,
F. W. BOND.